(12) United States Patent
Mueller et al.

(10) Patent No.: US 6,649,845 B2
(45) Date of Patent: Nov. 18, 2003

(54) ELONGATE OBJECT WITH INSULATING COATING

(75) Inventors: Friedrich Mueller, Lauf (DE); Gilles Widawski, Paris (FR); Andreas Rietz, Nuremberg (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/955,058

(22) Filed: Sep. 19, 2001

(65) Prior Publication Data

US 2002/0043393 A1 Apr. 18, 2002

(30) Foreign Application Priority Data

Sep. 20, 2000 (EP) ............................................. 00402595

(51) Int. Cl.$^7$ ................................................. H01B 7/00
(52) U.S. Cl. .............. 174/137 A; 174/110 R; 174/113 C; 174/140 C; 174/141 C
(58) Field of Search ............... 174/137 A, 110 R, 174/110 PM, 113 C, 119 R, 119 C, 140 C, 141 C, 168

(56) References Cited

U.S. PATENT DOCUMENTS

| | | | | |
|---|---|---|---|---|
| 3,901,852 A | * | 8/1975 | Shah | 528/85 |
| 4,495,040 A | * | 1/1985 | Panico | 204/155 |
| 5,650,205 A | * | 7/1997 | Shukushima | 428/35.8 |
| 6,274,239 B1 | * | 8/2001 | Peruzzotti et al. | 428/375 |
| 6,303,681 B1 | * | 10/2001 | Furukawa et al. | 524/436 |

* cited by examiner

Primary Examiner—Dean A. Reichard
Assistant Examiner—W. David Walkenhorst
(74) Attorney, Agent, or Firm—Sughrue Mion, PLLC

(57) ABSTRACT

An elongate object (e.g., a cable) with at least one transmission element arranged in a core thereof, in which an outer sheath (3) of insulation material is applied over the core. To achieve specific properties of the sheath (3), the sheath is provided with a coating (4) of a cross-linkable insulating material, which is very thin compared to the thickness of the sheath, and the individual properties of which are adjusted to the particular application of the object.

18 Claims, 1 Drawing Sheet

ELONGATE OBJECT WITH INSULATING COATING

This application is based on and claims the benefit of European Patent Application No. 00402595.3 filed Sep. 20, 2000, which is incorporated by reference herein.

BACKGROUND OF THE INVENTION

The invention relates to an elongate object with at least one transmission element arranged in a core thereof, in which an outer sheath of insulation material is applied over the core.

"Elongate objects" in terms of the invention may be electrical cables or lines, optical cables or lines, or pipelines. Accordingly, the transmission element is an electrical conductor, an optical conductor, or a pipe for conducting fluids. All these objects have been known for many years and are commercially available. They have the common feature that they are provided with an outer sheath made of an insulating material, for instance polyethylene or polyvinyl chloride. Since the technical problem to be solved by the invention is the same in all cases, the following description relates to cables, but vicariously also applies to lines and pipelines.

At least the cable cores are constructed in such a way that they are optimally suited to their purpose. In principle, this also applies to the outer sheath. The selection of the sheath's material, however, often involves compromises with respect to its properties, since, for instance, an electrically suitable material is not necessarily suitable if the cable is to be used in a rough environment where it is exposed, for example, to substantial friction or chemical influences. An example of this type of application is automotive engineering. In this case the sheath's insulating material must, in particular, be abrasion resistant and resistant against oil and gasoline. For other applications of the cable, the sheath will require different properties, for instance low friction and a hard surface, or heat resistance and good behavior in fire. For different applications, even if the cables have an identical core, they are provided with sheaths of different materials, which in many cases are applied to the core with different machines.

SUMMARY OF THE INVENTION

An object of the invention is to design the initially described cable in such a way that it can be adapted to different requirements at little cost.

According to the invention, this object is attained by providing the sheath with a coating of a cross-linkable insulating material, which is very thin compared to the thickness of the sheath, and the individual properties of which satisfy the particular cable application.

Such a cable can be constructed, without limitation, solely for the respective transmission purpose. This applies to both the core with at least one transmission element and, in particular, to the sheath the material of which can, for instance, be exclusively selected for specific properties. Regardless of the subsequent application, all cables can be equipped with an identical outer sheath. Each cable is finally provided with a very thin coating to make it suitable for the application for which it is intended. Said coating can be very thin compared to the sheath thickness, so that the increase in the outside diameter of the cable is insignificant. The material of this coating can be readily adjusted to meet the properties required by the exterior of the cable sheath, i.e., for instance, high abrasion resistance or oil resistance. Very little material is required for the coating, which may be applied to the cable sheath by processes known per se.

BRIEF DESCRIPTION OF THE DRAWINGS

Exemplary embodiments of the subject of the invention are illustrated in the drawings in which.

DETAILED DESCRIPTION OF THE INVENTION

The cable according to the invention has at least one transmission element, which in the case of electrical transmission comprises a conductor and the surrounding insulation, and in the case of optical transmission comprises an optical fiber with a protective layer. In this simplest case, the insulation, or the protective layer, corresponds to the sheath to which the very thin coating is applied. A cable may also comprise two or more transmission elements, each of which is equipped with the very thin coating. In case of two or more transmission elements, however, it is also possible to use a common sheath surrounding them, to which the very thin coating is then applied.

Figure 1:
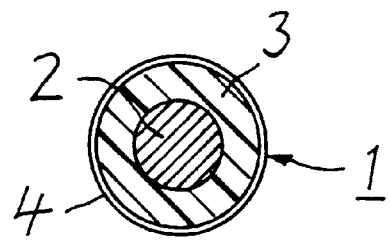
FIGS. 1 and 2 are cross-sections of two different cables according to the invention.

Cable 1 according to FIG. 1 has only one transmission element. It consists of a copper conductor 2 and an insulation material applied thereto, which simultaneously acts as the sheath 3 of cable 1. Over sheath 3 a coating 4 of a cross-linkable insulating material is applied, which has very specific properties that take into account external influences. Coating 4 is very thin compared to the thickness of sheath 3. Its thickness preferably ranges between 5 $\mu$m. and 50 $\mu$m. Sheath 3 can have a wall thickness ranging, for instance, between 0.2 mm and 0.8 mm.

Figure 2:
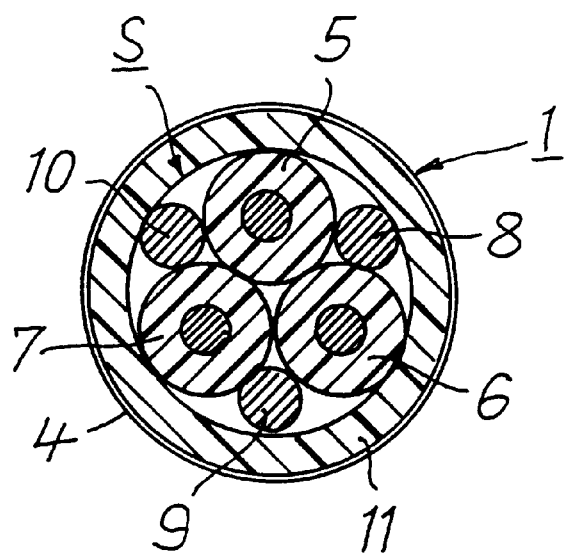

The embodiment depicted in FIG. 2 shows a cable 1 with transmission elements, which will be referred to below as wires. It has three wires 5, 6 and 7, which may be twisted together. In the interstices between wires 5, 6 and 7, there are filler elements 8, 9 and 10, so that the circumference of core S of cable 1 comprising the wires and the filler elements is as circular as possible. Core S is surrounded by an outer sheath 11 of insulation material which is, for instance, made of polyethylene. To this extent, a conventional electrical cable 1 with three transmission elements is described, the construction of which is basically unimportant here. Coating 4, which is very thin compared to the thickness of sheath 11, is again applied over sheath 11. Here, too, coating 4 is preferably 5 $\mu$m to 50 $\mu$m thick. The wall thickness of sheath 11 can range, for instance, between 0.2 mm and 1.2 mm.

Coating 4 may be applied during the production of cable 1 in the same process step as sheath 3 or 11. It may also be applied subsequently.

The material of coating 4 is cross-linkable, particularly with the use of ultraviolet light. It may be applied to sheath 3 or 11, for instance, as a solvent free varnish and then cross-linked by irradiation with UV light. Coating 4 may be applied, e.g., by spraying, dipping, wiping on, or vacuum coating the corresponding sheath 3 or 11. Suitable materials for coating 4 are for instance varnishes based on polyester, polyalcohol, polyurethane or polyacrylate.

The production rate for producing cable 1 depends on the dimensions and the rest of the cable structure. This rate, including the production of coating 4, may be, for instance, 1000 m/min. The time required for cross-linking or curing the material of coating 4 should be as short as possible, e.g., between 0.5 s and 1.0 s. This may be accomplished, for instance, by a UV source of correspondingly high power or by two or more UV sources.

Irrespective of the construction of core S and the material of sheath 3 or 11, coating 4 may impart the following properties to cable 1: good slip, resistance to abrasion, resistance to oil and gasoline, resistance to chemical influences, printability, heat resistance, non-flammability, scratch resistance, antistatic properties and/or color.

What is claimed is:

1. A plurality of at least two elongated objects, each of the objects having at least one transmission element arranged in a core thereof and an outer sheath of insulation material being applied around the core, wherein the sheath for each of said objects is made from the same insulation material, and wherein the sheath of the objects is surrounded by a coating of cross-linkable insulating material with a thickness between 5 $\mu$m and 50 $\mu$m.

2. The objects as claimed in claim 1, wherein a wall thickness of said sheath is between 0.2 mm and 1.2 mm thick.

3. The objects as claimed in claim 2, wherein the coating is a varnish based on one of the group comprising polyester, polyalcohol, polyurethane and polyacrylate.

4. The elongated objects of claim 1, wherein said coating is made of a UV curable cross-linkable material.

5. The elongated objects of claim 1, wherein said coating is a solvent free varnish.

6. The elongated objects of claim 1, wherein at least one of the coatings has different material properties than the remainder of said coatings.

7. An elongated object, comprising:

a plurality of elongated transmission elements disposed in a core of said elongated object;

a sheath surrounding said core; and a coating surrounding said sheath, wherein said coating has a thickness within the range of 5 $\mu$m and 50 $\mu$m.

8. The elongated object of claim 7, wherein a wall thickness of said sheath is between 0.2 mm and 1.2 mm thick.

9. The elongated object of claim 7, wherein the coating is a varnish based on one of the group comprising polyester, polyalcohol, polyurethane and polyacrylate.

10. The elongated object of claim 1, wherein said coating is made of a UV curable cross-linkable material.

11. The elongated object of claim 7, wherein said coating is a solvent free varnish.

12. An elongated object, comprising:

at least two transmission elements disposed in a core of said elongated object;

a sheath individually surrounding each of said at least two transmission elements, wherein each of said sheaths are made from the same material; and a coating individually surrounding each of said sheaths, wherein each of said coatings has a thickness within the range of 5 $\mu$m and 50 $\mu$m.

13. The elongated object of claim 12, wherein a wall thickness of each of said sheaths is between 0.2 mm and 1.2 mm thick.

14. The elongated object of claim 12, wherein at least one of said coatings is a varnish based on one of the group comprising polyester, polyalcohol, polyurethane and polyacrylate.

15. The elongated object of claim 12, wherein at least one of said coatings is made of a UV curable cross-linkable material.

16. The elongated object of claim 12, wherein at least one of said coatings is a solvent free varnish.

17. The elongated object of claim 12, wherein at least one of said coatings has different material properties than the remaining of said coatings.

18. An elongated object, comprising:

at least two transmission elements disposed in a core of said elongated object;

a sheath of insulating material surrounding said core with at least two transmission elements, wherein the material of said sheath exclusively is selected for properties of said elongated object; and a coating surrounding said sheath to provide a needed protection for the various conditions the said elongated object will experience, wherein said coating has a thickness within the range of 5 $\mu$m to 50 $\mu$m.

* * * * *